(12) United States Patent
Gerlach et al.

(10) Patent No.: US 7,472,417 B2
(45) Date of Patent: Dec. 30, 2008

(54) SYSTEM FOR DETECTION AND INDICATION OF A SECURE STATUS OF APPLIANCES

(75) Inventors: Hendrik Gerlach, Erlangen (DE); Thomas Talanis, Heroldsbach (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 844 days.

(21) Appl. No.: 10/662,811

(22) Filed: Sep. 16, 2003

(65) Prior Publication Data
US 2004/0125146 A1  Jul. 1, 2004

(30) Foreign Application Priority Data
Sep. 16, 2002  (DE)  ................. 102 42 917

(51) Int. Cl.
*G06F 11/00* (2006.01)
*G06F 11/30* (2006.01)
*H04L 9/00* (2006.01)
*H04L 9/32* (2006.01)

(52) U.S. Cl. ............... 726/23; 726/22; 726/23; 726/24; 726/25; 726/7; 713/154; 713/182; 713/188

(58) Field of Classification Search .......... 726/23
See application file for complete search history.

(56) References Cited

U.S. PATENT DOCUMENTS

| 6,910,135 | B1 * | 6/2005 | Grainger | 709/224 |
|---|---|---|---|---|
| 2003/0041264 | A1 * | 2/2003 | Black et al. | 713/201 |
| 2004/0049693 | A1 * | 3/2004 | Douglas | 713/200 |
| 2004/0049698 | A1 * | 3/2004 | Ott et al. | 713/201 |

* cited by examiner

*Primary Examiner*—Longbit Chai
(74) *Attorney, Agent, or Firm*—Staas & Halsey LLP

(57) ABSTRACT

A system and method detect and display a security status of appliances, in particular automation appliances and/or systems. The appliances have a detector mechanism for identification of a security status, as well as an external display and an internal display for the respective status. The internal display can be accessed with the aid of simple network management protocols via a management information base. The status of the internal display is passed on via a data transmission apparatus within the system, and is processed with the aid of a central security server for automation. Joint displays can display the security status of the respective lower-level appliances and/or appliance complexes at any desired hierarchy level in the system. Appliances without any security function can be integrated in the system by a representative.

29 Claims, 4 Drawing Sheets

SYSTEM FOR DETECTION AND INDICATION OF A SECURE STATUS OF APPLIANCES

CROSS REFERENCE TO RELATED APPLICATIONS

This application is based on and hereby claims priority to German Application No. 10242917.0 filed on Sep. 16, 2002, the contents of which are hereby incorporated by reference.

BACKGROUND OF THE INVENTION

The invention relates to a system and to a method for detection and display of the security status of appliances, and of appliances which are joined together to form complexes.

With the increasingly widespread use of public communications media such as the Internet or an Intranet and the standardized protocols (for example TCP/IP) which are used for them in automation technology, security aspects are becoming increasingly important. It can be expected that, in the future, automation appliances and systems will be used increasingly in a public communications environment. They therefore need to be equipped with powerful security mechanisms. These are referred to as so-called security extensions. Upgrading with security mechanisms and the introduction of appliances which are equipped with security mechanisms will not take place in one step in automation technology. This will result in coexistence of appliances with and without security mechanisms. For example, old appliances and low-cost appliances generally do not have any security mechanisms. Even in appliances with security mechanisms, individual security measures can be switched off, at least temporarily, for example for setting up purposes.

In the context used here, the meaning of the word security is as follows:
- The appliances and/or the automation system have/has access protection, that is to say users can access the resources of the appliance only with rights assigned to them.
- Communications protection exists, that is to say the data transfer from and to automation appliances and/or the data transfer via network components within an automation system are/is protected. In this case, the data is protected not only against changes to the data content (integrity), unauthorized monitoring (confidentiality) and infringement of reality (ensuring the authenticity including the lack of repetitions of already transmitted messages).
- Ensuring the necessary availability. This means, for example, protection against DoS attacks (denial of service attacks: one such attack is a method for loading a PC with a large number of senseless questions via a network. The aim in this case is that the PC/server can no longer be accessed) or spoofing (spoofing in general means a confusion attempt; for example, IP addresses may be corrupted).

In addition to the security status of a single automation appliance, the capability to identify the security of communications channels between the appliances involved and the overall security status of an automation system are also important. There are not yet any comprehensive solutions for security concepts for automation appliances and/or systems, since the appliances have until now been protected by compartmentalization of public accesses. In consequence, the problem has not occurred to the extent to be expected in the future. The increasingly widespread use of the Internet for automation technology as well means, however, that the introduction of powerful security mechanisms is important.

SUMMARY OF THE INVENTION

One aspect of the invention is based on the object of specifying a system and a method which allow the detection and display of the security status of an appliance and/or of a complex which is formed from two or more appliances, in situ, quickly and without further aids.

This object may be achieved by a system for display and/or detection of a security status of appliances which have internal security mechanisms, and/or of complexes which are composed of such appliances, having an appliance-internal unit for detection of the security status of at least one appliance, at least one display apparatus for external display of the security status of at least one appliance directly on the appliance, a display for internal display of the security status of at least one appliance directly in the appliance, and an apparatus for transmission of data between the appliances in a complex, with the status of the display being intended for further data processing in the complex.

The system and method are based on the knowledge that, as public communications media are used more widely, the security aspects relating to the individual appliances involved in the communication process are becoming increasingly important. In this case, security aspects are being focused on permission for only authorized users to have access to the respective appliances, and ensuring that data is transmitted correctly between different appliances. In order to make it possible to obtain knowledge about the specific security status of an appliance or of a system which is formed from two or more appliances at any time, it is thus advantageous for the appliances that are involved to be able to display their security status to a user. It is then possible to see directly whether an appliance has the appropriate security status that is necessary for the respective task that the appliance is carrying out. A user can decide directly whether he or she, for example, wishes to use the appliance for a particular function. It is also advantageous for the status of the individual appliances to be stored internally, so that this status is available for further data processing. This allows the overall security status to be displayed by higher-level systems or complexes which comprise two or more appliances.

A further advantageous embodiment is characterized in that the system is intended for display and/or detection of the security status of automation appliances and/or automation systems. Particularly in the field of automation for production and/or manufacturing plants, the Internet or an Intranet are increasingly being used for communications purposes. The use of standard protocols for communication is highly advantageous in this environment, since it allows low-cost transmission of data. The use of these public communications media consequently means that the automation systems for a plant are no longer completely compartmentalized from the environment. External access to the data by hackers is becoming increasingly possible. For this reason, the introduction of security mechanisms is of interest, particularly in the field of automation. In this case, the primary focus is not protection of data against unauthorized monitoring, but in fact protection against external intervention, which could result in a loss of production by disabling the automation system. In order to make it possible to use automation systems within the framework of public communications media as well, it is thus advantageous for the individual appliances provided in the automation system, as well as the overall system, to have a simple capability for detection and for display of the security status. This makes it possible for the plant operator to monitor the security status of parts of the automation of his plant at any time.

A further advantageous embodiment is characterized in that the display apparatus is intended for visual display of the security status. This makes it directly possible for an employee at the plant to read the security status of an automation appliance directly on the appliance at any time. The security status display is located at points on the appliance which are easily visible even in the installed state (if appropriate). Normally, the display is installed on the front panel of the respective appliance. In this case, steps are taken to allow the display to be read without any relatively complicated control procedures. These steps may use, for example, be a lamp or a LED (light-emitting diode). Various security aspects (for example access protection, communications security, protection deactivated) may, for example, be displayed via different displays. These may comprise different colors, different states, such as a continuous light or blinking. Two or more displays can also be fitted in parallel on one automation appliance, providing information relating to different security aspects. In addition to pure automation appliances, automation-specific network components can be equipped with security mechanisms and may be provided with an appropriate security display. These may, in this case for example, be CPs, switches, routers, bridges or automation firewalls.

A further advantageous embodiment is characterized in that an access unit is provided for automation user programs for the internal display. These programs are, for example, CFC, AWL and function block diagram. Within these user programs, security displays may be provided for individual components. The security displays can be configured in the same way as automation functions. The appropriate part of the user programs is in this case protected against unauthorized modification. The software that is implemented on the respective appliance is thus protected against unauthorized access.

A further advantageous embodiment is characterized in that a check of the security status of the internal display is provided by standard protocols via an appliance-internal information base. The internal security display can advantageously be checked using a standard protocol, the SNMP (simple network management protocol). The security status of all the appliances in an automation system can thus be monitored by network management tools. The security status of the respective appliance is in this case accessed via a so-called management information base (MIB). It is thus possible to use protocols that are available as standard, and there is no need to use any further aids for implementation of an appropriate security information system.

A further advantageous embodiment is characterized in that the system is intended for linking the status displays of the internal display of two or more appliances to joint displays of an overall security status of the appliances involved. As the perplexity of the system increases with a large number of appliances involved, these joint displays can provide information in a simple manner as to whether the respective part of the system is equipped with the intended security facilities, and whether they are active. This allows the user to monitor any individual appliance in the system. The security status information can be detected quickly, and it provides an overview of the overall status at any time.

A further advantageous embodiment is characterized in that the joint displays are intended for external visual display. Joint displays can thus also advantageously be output via the normal output channels, for example on cabinet indicator lamps or console displays. This ensures that the security status is displayed in a manner which can be identified easily, even at a higher level.

A further advantageous embodiment is characterized in that the joint displays are intended to be passed on via the apparatus for transmission of data for hierarchical linking to respective higher-level joint displays. This makes it possible to organize the security displays of a plant hierarchically. Beyond a certain level of complexity, the security displays of each of the lower-level appliances are combined. This combination process is carried out on the basis of the internal appliance displays. In this way, complex systems can be provided with simple and clear security status information. For example, the security status displays for specific production sections can be split, or else the security statuses for a distributed automation system can be displayed at two or more locations. The capability of the hierarchical structure in this case ensures better oversight of the overall system. The hierarchical combination of the displays within the system also allows so-called security diagnosis, since this makes it possible to trace the respective display of the security status back within the system.

A further advantageous embodiment of the system is characterized in that at least one server is provided for administration and display of the respective status of the joint displays. Beyond a certain level of complexity, this makes it possible to use a higher-level server (CSSA, central security server for automation). This server combines the security displays of the lower-level appliances, with the combination being based on the internal appliance displays. A flat hierarchical structure is in this case desirable. In this case, it is particularly advantageous for the server to be in the form of a controller or else a PC. The server feeds, for example, known displays which are used for the maintenance of the system, or the displays for control and monitoring systems. The use of these servers ensures that no additional hardware need be introduced for the administration and display of the security status within the system. This therefore provides low-cost administration and display of the security status within the system.

A further advantageous embodiment is characterized in that the system is intended for simulation of the security status of the internal display. Simulation of the security display is particularly advantageous in situations such as initial use. During this phase, this provides the capability to preset a display value, thus allowing the operation of the system to be tested and checked while it is being set up. In order to reduce the security risks during simulation, special authorization (for example a key-operated switch) is required to carry out the simulation. In addition, the simulation is interrupted after a time that is predetermined by the manufacturer. This predetermined time can be further restricted by an appropriate design and/or configuration. The activation of the simulation is a parameter of the security system on the appliances, or else on the server. Security parameters may be modified, for example via a special system module and/or via SNMP, taking into account the necessity for access protection from an automation user program.

A further advantageous embodiment is characterized in that the system is intended for integration of appliances without internal security mechanisms by representatives. This makes it possible for appliances which do not have a compatible internal security display or security extensions to be integrated in the secure system via a representative. This relates, in this case for example, to old appliances, appliances from other manufacturers, or low-cost appliances. The respective representative controls access from the secure system to these appliances and, in the opposite direction, access from these appliances to the secure system, with the representative allowing or refusing access by a protection mechanism. In this case, the representative is fully integrated in the described system for security identification and display. However, in addition to its own mechanism for security detection, it has additional mechanisms for integration of possible existing or incompatible mechanisms for security identification and display. This integration makes it possible for the representative to form system-conformal security displays in a manner that is representative of the appliances that are at a lower level than the representative. The protection mechanisms for the representative can be deactivated by special authorization for specific situations. The deactivation is included in the security display for the representative, and this likewise provides a simulation capability.

A further advantageous embodiment is characterized in that the apparatus is designed for transmission of data between the appliances in a complex as an Intranet and/or the Internet. This makes it possible to use the overall security system even between different locations, since data can be transmitted via the Internet. Furthermore, the Internet allows a low-cost capability for data transmission, since no dedicated infrastructure need be set up for this purpose.

BRIEF DESCRIPTION OF THE DRAWINGS

These and other objects and advantages of the present invention will become more apparent and more readily appreciated from the following description of the preferred embodiments, taken in conjunction with the accompanying drawings of which

DETAILED DESCRIPTION OF THE PREFERRED EMBODIMENT

Figure 1:
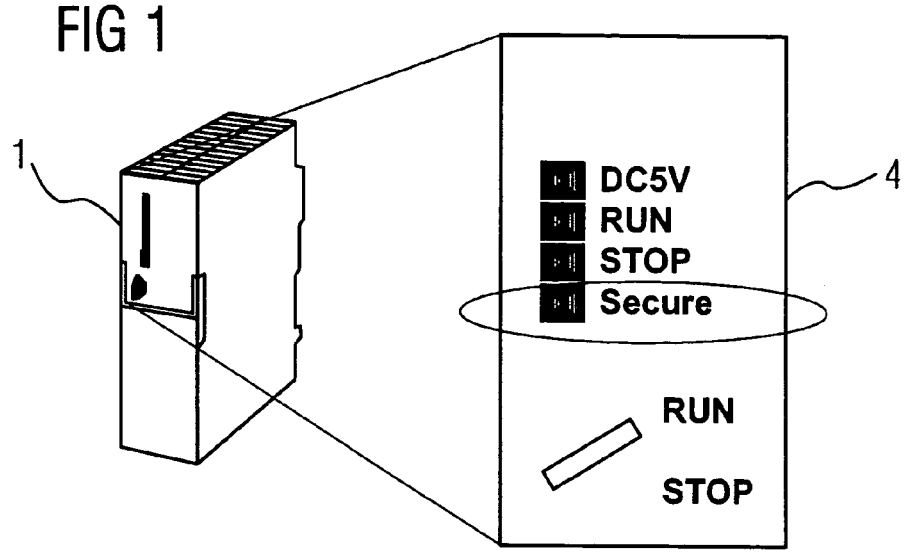
FIG. 1 shows an automation appliance with a visible security display.

Reference will now be made in detail to the preferred embodiments of the present invention, examples of which are illustrated in the accompanying drawings, wherein like reference numerals refer to like elements throughout.

FIG. 1 shows an exemplary embodiment of the external display 4 for the security status of an automation appliance 1. The display 4 is located on the appliance 1 at suitable points which can be seen well even when in the installed state. The display 4 is fitted on the front panel, as in the exemplary illustration. Lamps or light-emitting diodes, for example, are used for the display 4. The use of lamps such as these ensures that the display 4 can be seen well, and that it can be read easily. In order to display different security aspects, different colors may possibly be used for the display 4 or else different states, for example a continuous light or blinking. Two or more displays can also be used in parallel to signal different access aspects. This embodiment has, in particular, the advantage that the use of simple light-emitting diodes or lamps on a display which is fitted externally in any case represents a low-cost solution.

Figure 2:
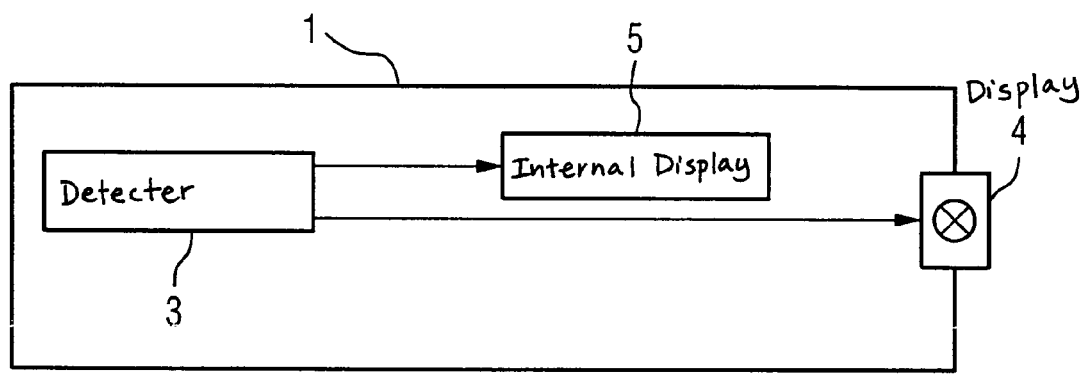
FIG. 2 shows a schematic illustration of an appliance with an external and an internal security display.

FIG. 2 shows a schematic illustration of an appliance 1 which has an external display 4 that displays a security status of the appliance 1 externally, and which has an internal display 5 for an internal security status of the appliance 1. The security status of the appliance 1 is detected via a detector mechanism 3. The detector mechanism 3 identifies whether the appliance 1 is in a secure state.

The illustrated embodiment has, in particular, the advantage that the appliance 1 can display its security status both externally and visually via the external display 4, and internally via the internal display 5. The internal display 5 in this case forms the basis for technical further processing. This makes it possible, for example, to combine the security displays of two or more appliances to form so-called joint displays. The internal and external displays 4, 5 can be fed, in the same way as shown in exemplary embodiment, from the same detector mechanism 3 for identification of the state. However, it is also feasible for the external display 4 to be derived from the internal display 5. The illustrated exemplary embodiment shows one simple option for implementation of security displays, both externally and internally. The internal display 5 may in this case be a simple mechanism, such as the setting of a flag. This flag can then be read by automation user programs, and can be interpreted in a simple manner.

Figure 3:
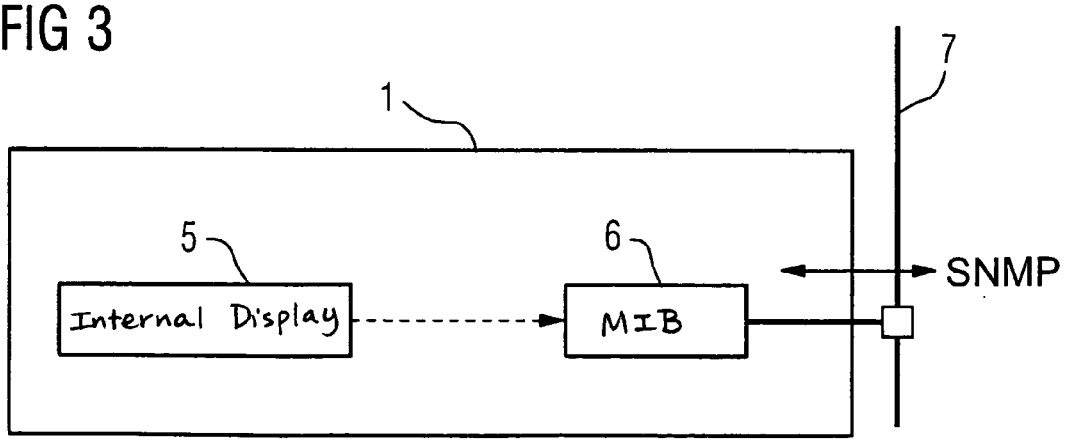
FIG. 3 shows a schematic illustration of access to the security display via standard protocols.

FIG. 3 shows an exemplary embodiment of access by standard network protocols to the security display of an appliance 1. The access is in this case provided via a so-called management information base (MIB) 6. The management information base 6 is located in the appliance 1, where it is able to read the status set on the internal display 5, and to allow external access to the display 5. In this case, the information is passed on via a data transmission apparatus 7. So-called simple network management protocols (SNMP) are used for passing on the information.

The illustrated embodiment has, in particular, the advantage that standard protocols, as are used in TCP/IP-based networks, can be used for passing on the information. In this case, there is no need for complex implementation of additional data transmission apparatuses. The security status of an appliance and/or of the overall automation system can be monitored by simple network management tools.

Figure 4:
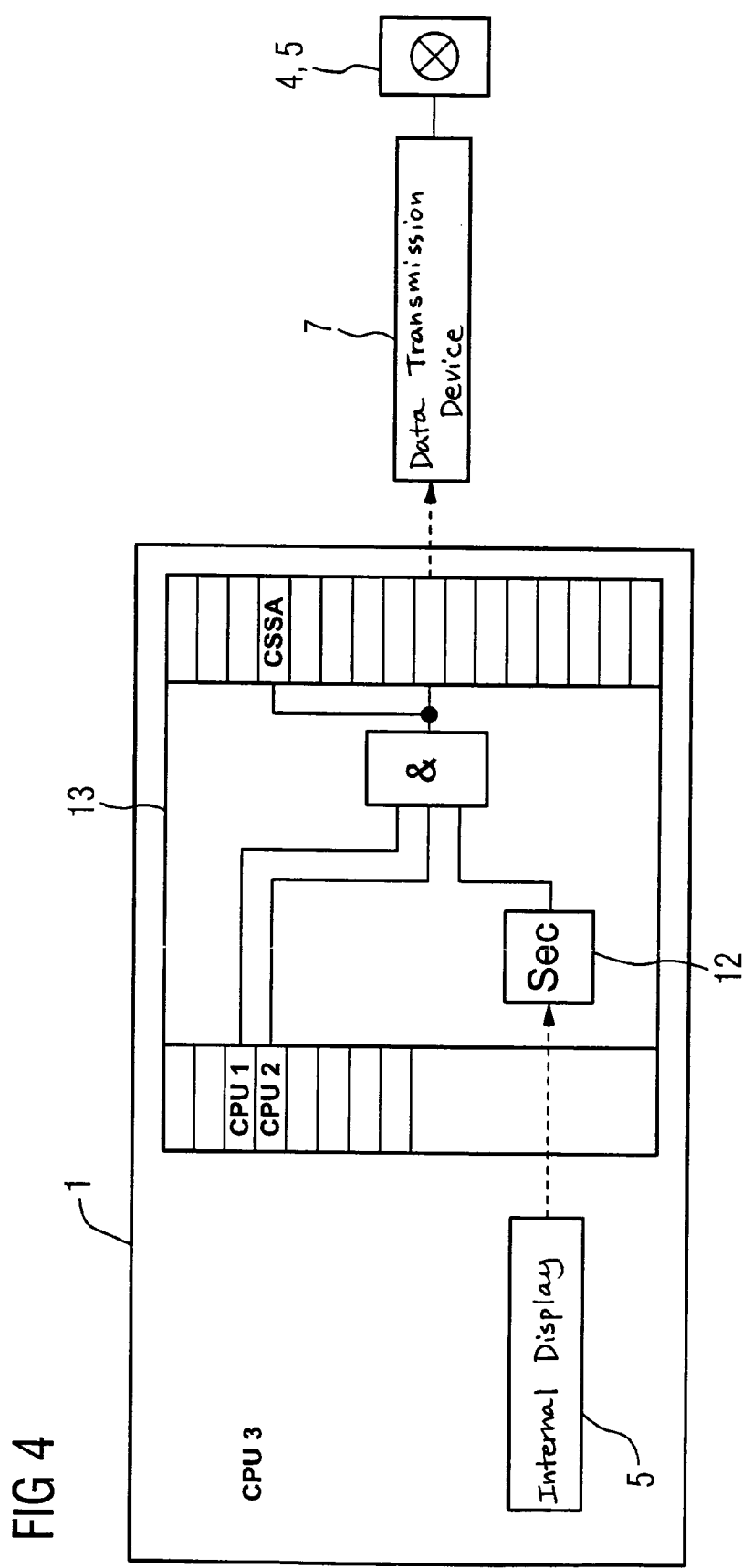
FIG. 4 shows a schematic illustration of the access option via standard automation applications.

FIG. 4 shows an exemplary embodiment, in which an automation user program 13 can access the internal security display 5 of an automation appliance 1. Access is made possible by special functional modules 12. The security displays can be passed on via a data transmission apparatus 7 to appropriate display units 4, 5.

The illustrated embodiment has, in particular, the advantage that it allows direct access by user programs. This allows security displays of individual components to be interconnected to form joint displays within the user programs. The security displays can be configured in a corresponding manner to automation functions, and the corresponding part of the user programs can in this case be protected against unauthorized modification. The date can be transmitted via normal networks, such as field buses. The exemplary refinement of the system allows simple configuration of the security system within the automation systems.

Figure 5:
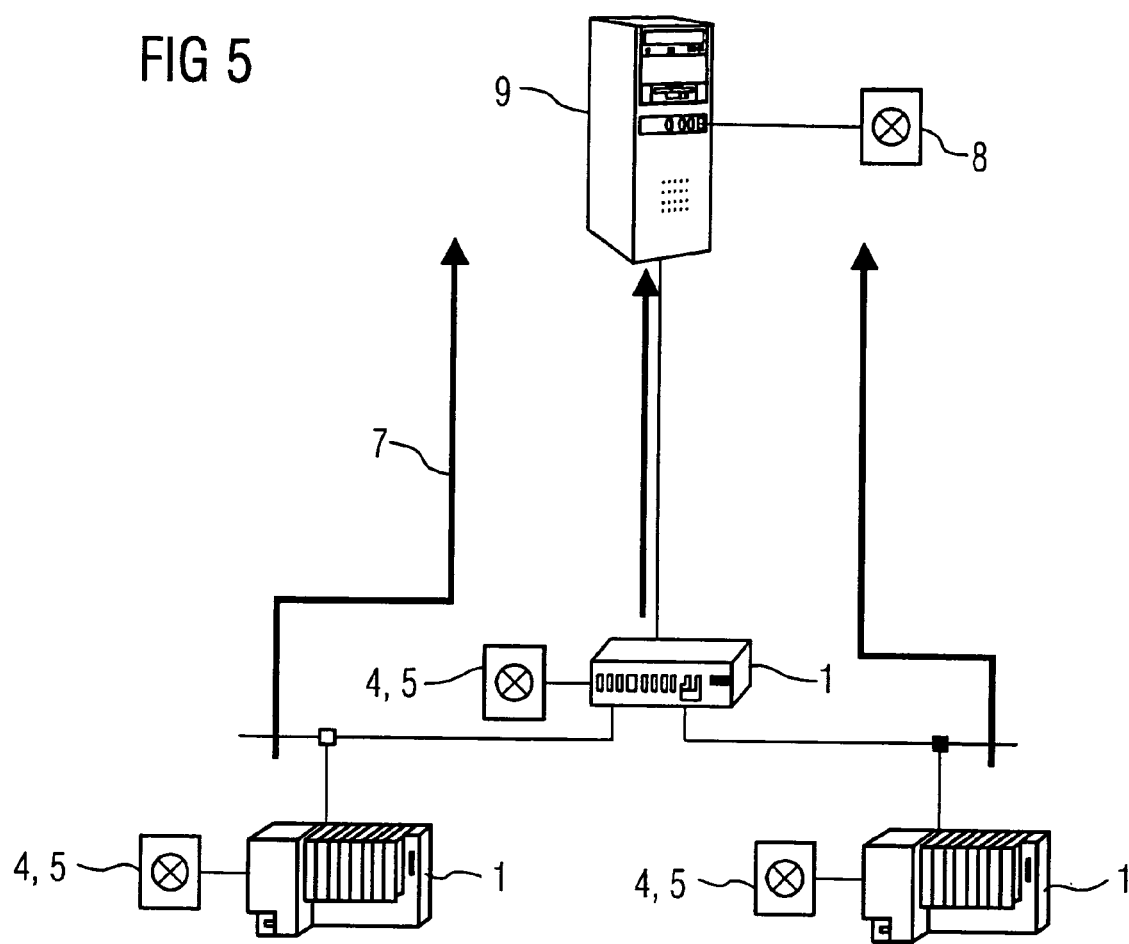
FIG. 5 shows a schematic illustration of the combination of security displays to form joint displays.

FIG. 5 shows an exemplary refinement of the security system, in which the security displays 4, 5 of the individual appliances 1 are passed on via a data transmission apparatus 7 to a server 9, where they are displayed in the form of a joint display 8. The illustrated embodiment has the advantage that the security displays of the individual appliances can be combined to form a joint display 8. Beyond a specific level of complexity, a higher-level server 9, a so-called central security server for automation, CSSA, is introduced for this purpose. The server 9 combines the security displays from the lower-level appliances 1. This combination is carried out on the basis of the internal displays 5 of the appliances 1, with a flat structure being desirable.

The illustrated embodiment has, in particular, the advantage that the CSSA 9 may be in the form of a simple controller, PC or the like. There is thus no need to introduce special appliances to display the joint displays. The use of existing appliances within the automation system allows a low-cost implementation. The server 9 may in this case also feed known displays, for example via control and monitoring systems. In this case, the joint display 8 does not provide any information about the absolute security of a system. Instead, it indicates whether the security facilities that are provided are active.

Figure 6:
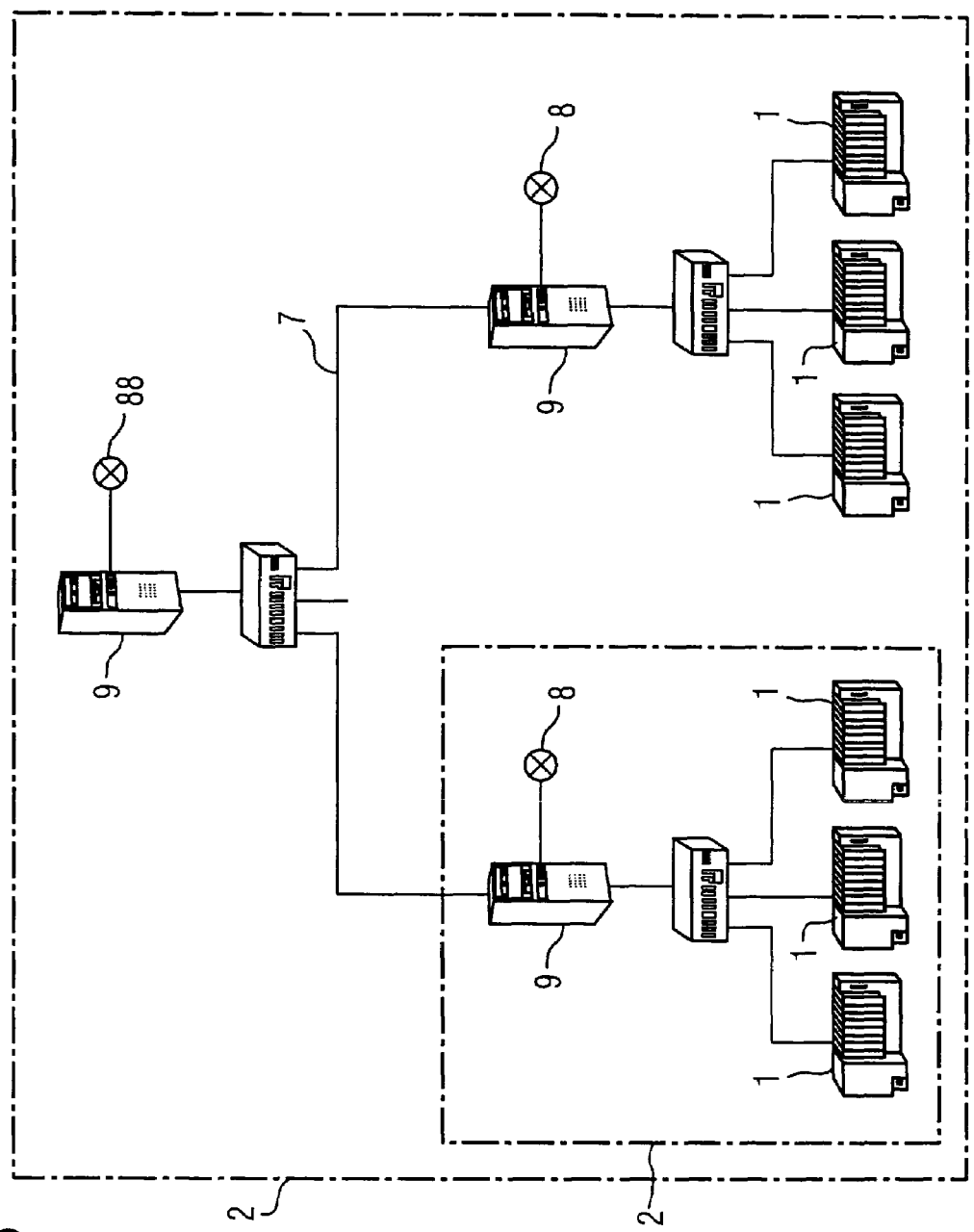
FIG. 6 shows a schematic illustration of an automation system with hierarchically subdivided joint displays.

FIG. 6 shows an exemplary embodiment of a hierarchical breakdown of the security system. In this case, the security displays 5 of individual appliances 1 are passed on via data transmission apparatuses 7 to servers 9, which display the security systems of the lower-level appliances in a joint display 8, and these joint displays 8 are in turn passed on within the system via a data transmission apparatus 7 to higher-lever servers 9, and these servers 9 feed higher-level joint displays 88. The joint displays 88 display the security status of the overall system with all the lower-level parts. In this case, two or more appliances 1 are joined together to form a so-called appliance complex 2.

The illustrated embodiment has, in particular, the advantage that a user is provided with an overview of the current security status at all levels of a system, for example an automation system. Important control actions can be carried out or prevented on this basis. Security gaps and/or penetration locations can be found and, if appropriate, rectified, and faults in the security configuration can be identified. The structuring of the security system in two or more hierarchy levels also allows new appliance complexes to be added easily. It results in the overall solution being scalable, and takes account of migration options.

The proposed hierarchical structure is particularly advantageous for security diagnosis, since it allows tracing back via the respective paths within the structure. In this case, it is then possible to find out precisely the complex 2 in which the security functions are faulty. The diagnosis is carried out by a configured interchange of the signals for the security display via automation user programs, such as function plans, with the process of tracing back in this case being carried out via the display of the initiating path (for logic links) on the dynamic function plans (that is to say function plans which display current values). A criteria analysis, that is to say automatic detection of discrepancies from the nominal state with appropriate tracing back, is carried out as far as the source. Furthermore, the relevant MIB displays can be checked via SNMP. Tracing backwards in the downward direction through the hierarchy is carried out via rule-based evaluation of the cause or source, with the rules being produced from a security configuration of the system.

Figure 7:
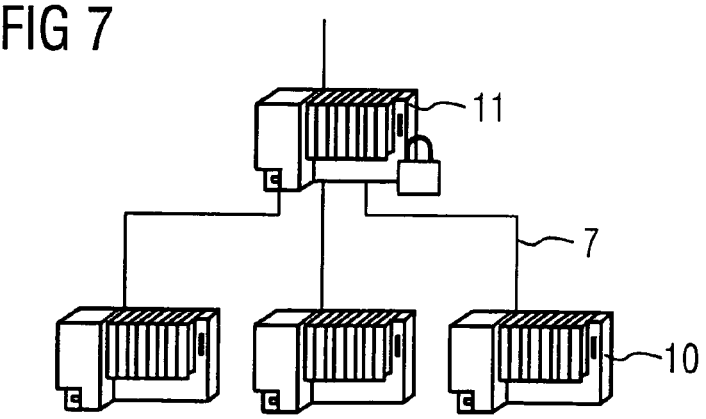
FIG. 7 shows a schematic illustration of a secure representative for appliances without their own security mechanisms.

FIG. 7 shows an exemplary embodiment of the security system, in which appliances 10 which do not have their own security mechanisms are represented by a representative 11. The data in this case is transmitted via the data transmission apparatus 7.

The advantage of the illustrated exemplary embodiment is, in particular, the capability to use the representatives to integrate in the system appliances which do not have their own security display and/or their own security extensions. These may, for example, be old appliances, appliances from other manufacturers, or low-cost appliances. The capability for integration of appliances such as these is particularly advantageous in a transitional phase, since it provides the capability to establish a secure system without at the same time having to change all the appliances in the automation system, throughout the entire plant. This results in a low-cost capability to set up a secure system. The access from the secure system to the appliances 10 which do not have their own security mechanisms and, in the opposite direction, the access from these appliances 10 to the secure system, are in this case controlled by the respective representative 11. A protection mechanism thus allows or denies access. The representative 11 is in this case fully integrated in the described system for security identification and display. In addition to a mechanism dedicated to it for security status identification, it has further mechanisms for integration of security identification and display mechanisms which may be present but are incompatible. This integration makes it possible for the representative 11 to form system-conformal security displays, as being representative for its lower-level appliances 10. The protection mechanisms in the representative 11 can be deactivated for specific situations, with special authorization. The deactivation is included in the security display on the representative 11. The representative 11 obtains the information about the security of the lower-level appliances 10 directly, for example, from these appliances. In this case, the appliances can offer the information in various formats. The representative 11 may also itself have or itself control the information about the security status of the appliances 10. In this case, it acts on the firewall principle. The representative 11 is responsible for the security of the appliances 10 which are subordinate to it.

In summary, a system and a method detect and display a security status of appliances, in particular automation appliances and/or systems. The appliances 1 have a detector mechanism 3 for identification of a security status, as well as an external display 4 and an internal display 5 for the respective status. The internal display 5 can be accessed via a management information base (MIB) 6 with the aid of simple network management protocols (SNMP). The status of the internal display is passed on via a data transmission apparatus 7 within the system, and is processed with the aid of central security servers for automation (CSSA). Joint displays 8, 88 can display the security status of the respective lower-level appliances 1 and/or appliance complexes 2 at any desired hierarchy level in the system. Appliances without any security function 10 can be integrated in the system by a representative 11.

The invention has been described in detail with particular reference to preferred embodiments thereof and examples, but it will be understood that variations and modifications can be effected within the spirit and scope of the invention.

The invention claimed is:

1. A system comprising:
    a security status detector disposed on an inside of an automation appliance, the security status detector detecting a current security status of the automation appliance within which the detector is disposed;
    an external display disposed directly on an outside of the automation appliance, the external display displaying the current security status of the automation appliance directly on an outside of the automation appliance upon which the external display is disposed;
    an internal display disposed on the inside of the automation appliance, the internal display displaying the current security status of the automation appliance within the inside of the automation appliance; and a transmission unit to transmit security status data between other automation appliances in a network of automation appliances such that the current security status data can be subjected to data processing in the network of automation appliances;

wherein a joint display of the system displays a security status of respective low-level appliance complexes at any desired hierarchy level according to a system structure in a form of internal and external displays.

2. The system as claimed in claim 1, wherein the appliances are automation appliances.

3. The system as claimed in claim 1, wherein the external display visually displays the current security status.

4. The system as claimed in claim 1, further comprising an access unit to run automation user programs on the internal display.

5. The system as claimed in claim 1, further comprising an internal-information base to provide access to the current security status from the network of appliances via standard protocols, access to the current security status being provided by the internal display.

6. The system as claimed in claim 1, further comprising a joint display to display an overall security status of a plurality of appliances, respectively having their internal displays linked.

7. The system as claimed in claim 6, wherein the joint display is an external visual display.

8. The system as claimed in claim 6, wherein
there are a plurality of joint displays, each displaying the status of a different plurality of appliances, and
the overall security status is passed on from the joint display to a higher-level joint display that displays an overall security status of the appliances communicating with the joint displays.

9. The system as claimed in claim 6, wherein
there are a plurality of joint displays, each displaying the status of a different plurality of appliances, and
a server is provided for administration and display of the respective status of the joint displays.

10. The system as claimed in claim 1, wherein the current security status of the internal display can be simulated such that the internal display is active even without the appliance-internal unit detecting the current security status.

11. The system as claimed in claim 1, wherein
a portion of the appliances have internal security mechanisms,
a portion of the appliances are without internal security mechanisms, and
the system integrates appliances without internal security mechanisms with appliances that have internal security mechanisms.

12. The system as claimed in claim 1, wherein the transmission unit transmits the current security status via an Intranet and/or the Internet.

13. A method for display and detection of a current security status of an appliance comprising:
disposing a security status detector on an inside of the appliance, the security status detector detecting the current security status of the appliance within which the detector is disposed;
disposing an external display directly on an outside of the appliance, the external display displaying the current security status of the appliance directly on an outside of the appliance upon which the external display is disposed;

disposing an internal display on the inside of the appliance, the internal display displaying the current security status of the appliance within the inside of the appliance; and
transmitting security status data between other appliances in a network of appliances such that the current security status data can be subjected to data processing in the network of appliances; and
wherein a joint display of the system displays a security status of respective low-level appliance complexes at any desired hierarchy level according to a system structure in a form of internal and external displays.

14. The method as claimed in claim 13, wherein the appliances are automation appliances.

15. The method as claimed in claim 13, wherein the current security status is displayed visually.

16. The method as claimed in claim 13 wherein an access unit provides automation user programs with access an internal display unit that displays the current security status on the inside of the appliance.

17. The method as claimed in claim 13, wherein the current security status is checked by standard protocols via an appliance-internal information base.

18. The method as claimed in claim 13, wherein
two or more appliances are linked, and
the method further comprises displaying an overall security status of the two or more appliances.

19. The method as claimed in claim 18, wherein the overall security status is displayed externally and visually.

20. The method as claimed in claim 18, wherein
the overall security status is displayed on a joint display,
there are a plurality of joint displays, each displaying the status of a different plurality of appliances, and
the overall security status is passed on from the joint display to a higher-level joint display that displays an overall security status of the appliances communicating with the joint displays the joint displays are linked to hierarchically higher-level joint displays.

21. The method as claimed in claim 18, wherein
the overall security status is displayed on a joint display,
there are a plurality of joint displays, each displaying the status of a different plurality of appliances, and
a server is provided for administration and display of the respective status of the joint displays the status of each of the joint displays is displayed and administered by at least one server.

22. The method as claimed in claim 13, wherein the current security status of an internal display unit can be simulated such that the appliance operates at an assumed security status when the current security status of the appliance cannot be detected.

23. The method as claimed in claim 13, wherein
a portion of the appliances have internal security mechanisms,
a portion of the appliances are without internal security mechanisms, and
the method further comprises integrating appliances without internal security mechanisms with appliances that have internal security mechanisms.

24. The method as claimed in claim 13, wherein the data is transmitted via an Intranet and/or the Internet.

25. An automation appliance for display of a current security status, having
a security status detector on an inside of the automation appliance, the security status detector detecting the current security status of the automation appliance within which the detector is disposed;

an appliance-internal unit disposed on the inside of the automation appliance to detect the current security status of the automation appliance in a format readable by other internal devices within the automation appliance and displaying the current security status of the automation appliance within the inside of the automation appliance;

an external display disposed directly on an outside of the automation appliance to display the current security status of the automation appliance directly on an outside of the appliance; and a transmission unit to transmit security status data between other automation appliances in a network of automation appliances such that the current security status data can be subjected to data processing in the network of automation appliances; and wherein a joint display of the system displays a security status of respective low-level appliance complexes at any desired hierarchy level according to a system structure in a form of internal and external displays.

26. The automation appliance as claimed in claim 25, wherein the external display visually displays the current security status.

27. The automation appliance as claimed in claim 25, further comprising an access unit to run automation user programs on the internal display.

28. The automation appliance as claimed in claim 25, further comprising an internal-information base to provide external access to the current security status via standard protocols.

29. The automation appliance as claimed in claim 25, wherein the internal display functions as an input for other devices within the appliance.

* * * * *